United States Patent [19]

Carlson, deceased et al.

[11] E Re. 29,315

[45] Reissued July 19, 1977

[54] ASPHALTENE HYDRODESULFURIZATION WITH SMALL CATALYST PARTICLES UTILIZING A HYDROGEN QUENCH FOR THE REACTION

[75] Inventors: Edgar Carlson, deceased, late of Allison Park, Pa., by Gulf Science and Technology Company, Pittsburgh, Pa.; Alfred M. Henke, Springdale, Pa.; William R. Lehrian, Pittsburgh, Pa.; Joel D. McKinney, Pittsburgh, Pa.; Kirk J. Metzger, Pittsburgh, Pa.

[73] Assignee: Gulf Research & Development Company, Pittsburgh, Pa.

[21] Appl. No.: 721,419

[22] Filed: Sept. 8, 1976

Related U.S. Patent Documents

Reissue of:

[64] Patent No.: 3,562,800
Issued: Feb. 9, 1971
Appl. No.: 770,625
Filed: Oct. 25, 1968

[51] Int. Cl.[2] ..... C10G 23/02

[52] U.S. Cl. ..... 208/216

[58] Field of Search ..... 208/216, 89

[56] References Cited

U.S. PATENT DOCUMENTS

| | | | |
|---|---|---|---|
| 2,890,162 | 6/1959 | Anderson, Jr. et al. | 208/216 |
| 2,938,857 | 5/1960 | Johnson et al. | 208/89 |
| 3,271,301 | 9/1966 | Galbreath | 208/216 |
| 3,365,385 | 1/1968 | Kay et al. | 208/216 |
| 3,383,306 | 5/1968 | Rodgers et al. | 208/216 |

FOREIGN PATENT DOCUMENTS

| | | | |
|---|---|---|---|
| 905,809 | 9/1962 | United Kingdom | 208/216 |

OTHER PUBLICATIONS

"Hydrodesulfurization of Khafii Crude Oil", Ohtsuka et al., Bulletin of the Japan Petroleum Institute, vol. 10, May 1968 (English translation).

*Primary Examiner*—George Crasanakis

[57] ABSTRACT

The hydrodesulfurization of a crude oil or a reduced crude containing the asphaltene fraction proceeds at unexpectedly low temperatures by utilizing a catalyst comprising a Group VI and Group VIII metal on alumina when the catalyst particles are very small and have a diameter between about 1/20 and 1/10 inch and the reaction is quenched with hydrogen.

24 Claims, 8 Drawing Figures

Figure 1:
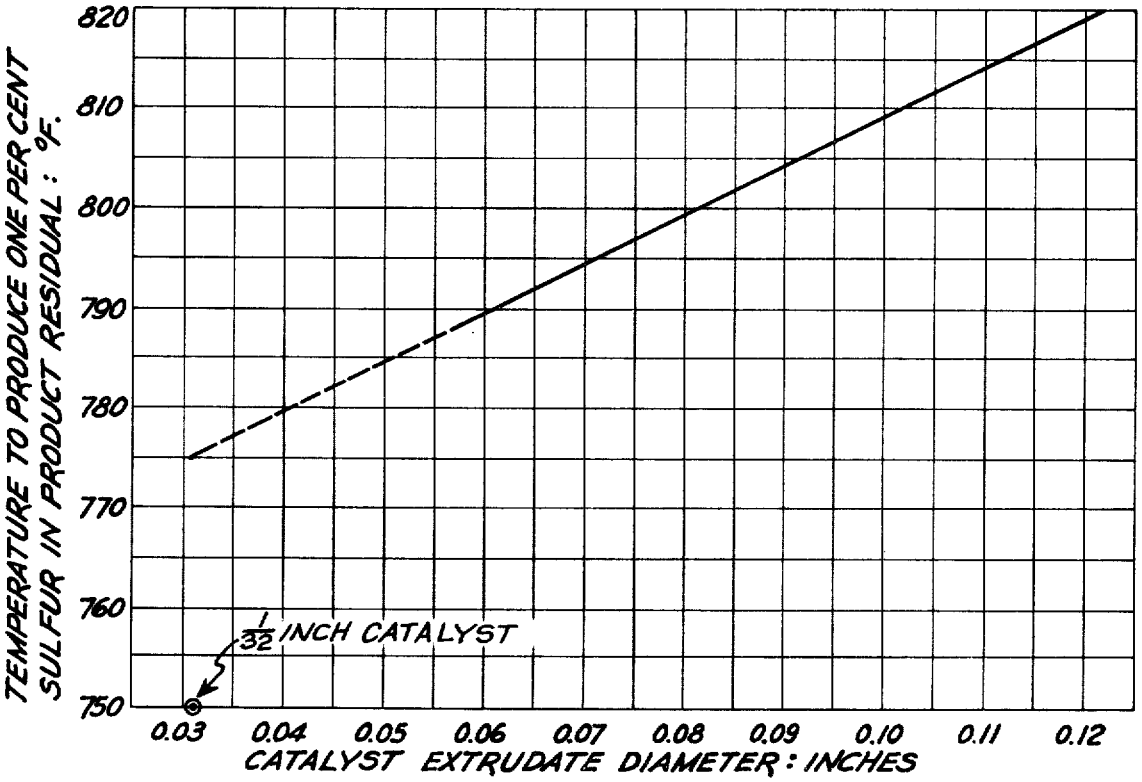

INVENTORS
EDGAR CARLSON
ALFRED M. HENKE
WILLIAM R. LEHRIAN
JOEL D. McKINNEY
KIRK J. METZGER

INVENTORS
EDGAR CARLSON
ALFRED M. HENKE
WILLIAM R. LEHRIAN
JOEL D. McKINNEY
KIRK J. METZGER

INVENTORS
EDGAR CARLSON
ALFRED M. HENKE
WILLIAM R. LEHRIAN
JOEL D. McKINNEY
KIRK J. METZGER

INVENTORS
EDGAR CARLSON
ALFRED M. HENKE
WILLIAM R. LEHRIAN
JOEL D. McKINNEY
KIRK J. METZGER

ASPHALTENE HYDRODESULFURIZATION WITH SMALL CATALYST PARTICLES UTILIZING A HYDROGEN QUENCH FOR THE REACTION

Matter enclosed in heavy brackets [ ] appears in the original patent but forms no part of this reissue specification; matter printed in italics indicates the additions made by reissue.

The present invention relates to a process for the hydrodesulfurization of a crude oil or a reduced crude oil in the presence of a supported Group VI and Group VIII metal hydrodesulfurization catalyst having an exceptionally small particle size. Substantially all or a large proportion of the catalyst particles of the present invention have a diameter of between and about 1/20 and 1/40 inch.

Although nickel-cobalt-molybdenum is the preferred active metals combination for the catalyst of this invention, other combinations can be utilized such as cobalt-molybdenum, nickel-tungsten and nickel-molybdenum. Alumina is the preferred supporting material but other non-cracking supports can also be used such as silica alumina and silica magnesia.

Hydrodesulfurization catalysts comprising supported Group VI and Group VIII metals, such as nickel-cobalt-molybdenum on alumina, having a particle size as small as the catalyst particles of the present invention were not heretofore considered advantageous for use in a large or commercial scale because a bed comprising particles of the small size of the present invention induces an extremely high pressure drop, which is highly deleterious to a hydrodesulfurization process which has a limited inlet pressure because the temperature required by a catalyst to accomplish a given degree of desulfurization increases with loss of hydrogen pressure.

The present invention relates to a hydrodesulfurization process in which the small particle size catalyst is utilized in a manner which manifests an unexpectedly high activity so that hydrodesulfurization of crude oil charge to any desired sulfur level, such as a 1 percent sulfur level, proceeds at an unexpectedly low temperature. Although extrapolation of the initial temperature required to produce a liquid product having a 1 percent sulfur content with 1/8 inch diameter and 1/16 inch diameter NiCoMo catalyst particles, which are above the size of the present invention, indicates that the temperature requirement would be lower with the small catalyst particles of this invention we have found that the small size NiCoMo catalyst particles of the present invention permit the use of a hydrodesulfurization temperature which is considerably lower than the temperature which would be expected by extrapolation of the temperature data obtained with larger size catalyst particles. Moreover, the very discovery that hydrodesulfurization with the catalyst of the present invention could be carried out at an unexpectedly low temperature has heretofore been obscured by the extremely high pressure drop through a bed of the small size catalyst particles of the present invention. The reason is that in a hydrodesulfurization process pressure drop itself increases the temperature requirement to achieve a given degree of desulfurization usually by an extent which equals or exceeds the temperature advantage due to the small particle size of this invention.

Figure 2:
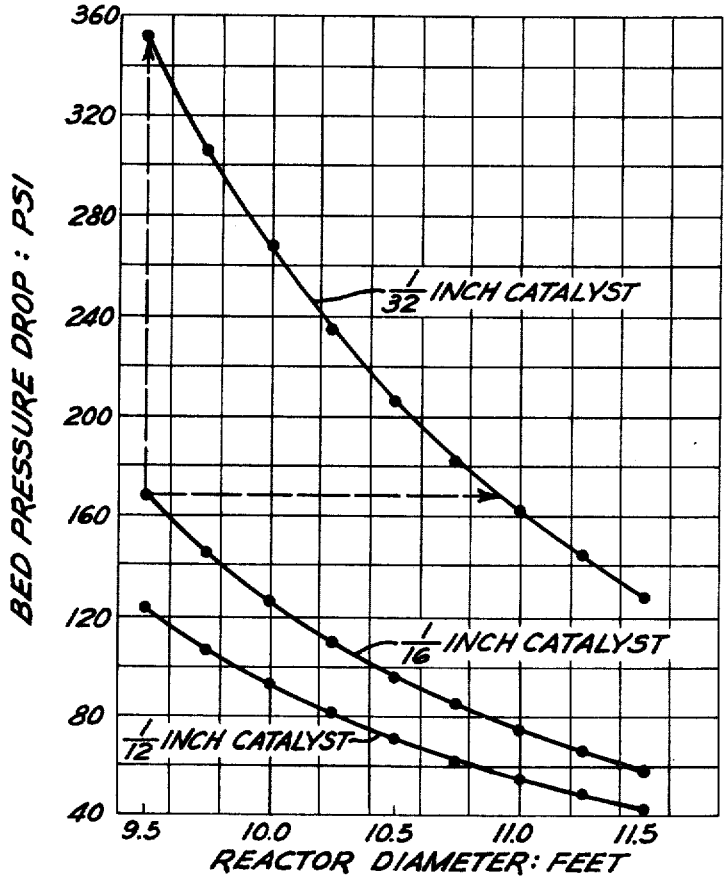

It is seen that there are two unexpected features surrounding the present invention. The first is that there is an unexpectedly great temperature advantage achievable in a hydrodesulfurization process by employing a bed of catalyst having a particle size of the present invention. FIG. 1 (all figures are discussed in detail herein below) shows that the hydrodesulfurization temperature required to produce a residual product having 1 percent sulfur with a 1/32 inch catalyst of the present invention is much lower than what would be expected by extrapolation of the line connecting the data obtained with 1/8 and 1/16 inch catalyst particles even though the surface area defined by the pores of all three catalyst is about the same. The second feature is that the unexpected temperature advantage is completely disguised by the ordinary approach to its determination, i.e. by making a test in a reactor with relatively large size catalyst particles as a blank and then making a test in the same reactor under the same conditions except that the catalyst particle size is within the range of the present invention (particle size being the only variable changed in the two tests). In this regard, the vertical dashed line in FIG. 2 shows that if a 1/16 inch catalyst, which is larger than a catalyst of this invention, is tested in a 9.5 foot diameter reactor and then a 1/32 inch catalyst of this invention is tested in the same reactor under unchanged conditions, including an unchanged space velocity, the pressure drop in the 1/32 inch catalyst bed in the same reactor is so much greater than that for the 1/16 inch catalyst that the pressure drop increase itself would easily nullify the temperature advantage achievable because of particle size and therefore the advantage of the present invention would be completely masked. The horizontal dashed line of FIG. 2 shows that if the 1/16 inch catalyst is tested in a 9.5 diameter reactor a comparable pressure drop can only be achieved if the 1/32 inch catalyst is tested in an 11 foot diameter reactor, when both tests are performed at a liquid hourly space velocity of one. Therefore, it is only by making the tests in two different reactors, to equalize pressure drop, that the temperature advantage of the 1/32 inch catalyst becomes apparent. It is clear that not merely one but rather two variables must be changed to reveal the advantage of the present invention.

Figure 3:
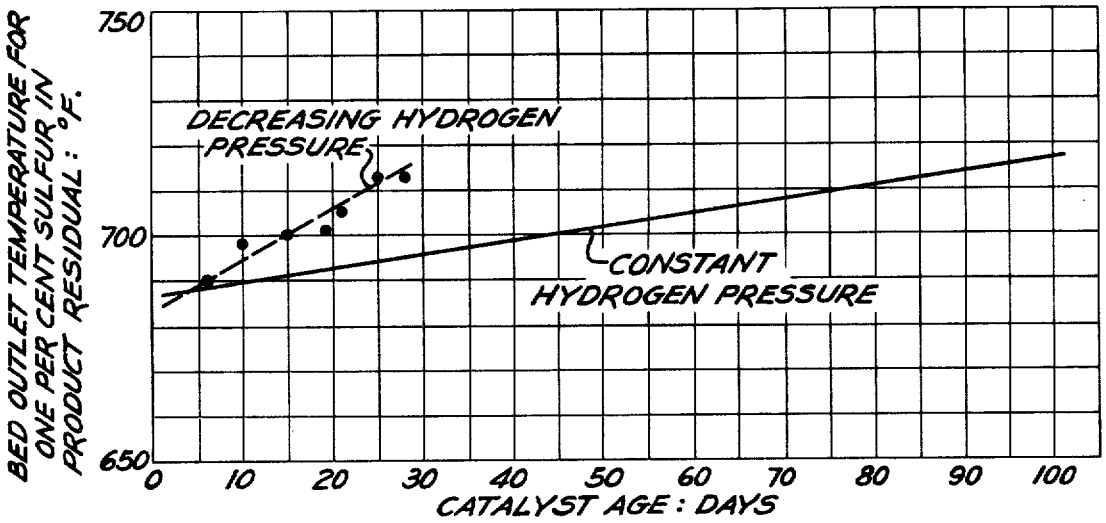

The great effect of pressure drop upon temperature requirements to produce a hydrocarbon product having a 1 percent sulfur content is demonstrated by reference to FIG. 3. In FIG. 3 the solid line represents a hydrodesulfurization process having a constant hydrogen partial pressure of 1830–1850 p.s.i.a. The dashed line represents a decreasing hydrogen partial pressure starting with the 1830–1850 p.s.i.a. range to a range of 1720–1740 p.s.i.a. which reduction is caused by the recycle hydrogen stream becoming progressively diluted with other gases. FIG. 3 shows that as the hydrogen partial pressure progressivey decreases the temperature required to produce a 1 percent sulfur product progressively increases, so that it is considerably above the temperature required with constant hydrogen partial pressure. Since pressure drop due to flow across a catalyst bed similarly reduces partial hydrogen pressure, FIG. 3 illustrates the detrimental effect upon reaction temperature of pressure drop through a catalyst bed of this invention.

The charge to the process of this invention can be a full crude or a reduced crude containing substantially all of the residual asphaltenes of the full crude. The residual asphaltenes are deficient in hydrogen and comprise only about 10 percent of the charge oil but contain substantially all of the metallic components present in the crude, such as nickel and vanadium. Since the desulfurization catalyst has a greater activity for demetalization than for desulfurization, it removes nickel and vanadium from a charge stock more rapidly than it removes sulfur. These metals deposit most heavily on the outermost regions of the catalyst cross section and tend to reduce the desulfurization activity of the catalyst. Nickel and vanadium removal constitutes substantially the entire deactivation of the catalyst while sulfur and nitrogen removal contributes very little to catalyst deactivations. Furthermore, the asphaltenes comprise the highest boiling fraction of the full crude and contain the largest molecules in the crude. These large molecules are the ones least able to penetrate catalyst pores and most likely to plug these pores. The present invention is directed towards the hydrodesulfurization of a full crude or a residual oil containing substantially the entire asphaltene fraction of the crude from which it is derived and which therefore contains 95 to 99 weight percent or more of the nickel and vanadium content of the full crude. The nickel, vanadium and sulfur content of the liquid charge can vary over a wide range. For example, nickel and vanadium can comprise 0.002 to 0.03 weight percent (20 to 300 parts per million) or more of the charge oil while sulfur can comprise about 2 to 6 weight percent or more of the charge oil. If an oil containing smaller quantities of nickel, vanadium and sulfur is processed, such as a furnace oil, considerably lower temperature conditions, pressures as low as 1000 pounds per square inch, lower gas circulation rates and hydrogen of lower purity than required by this invention, will suffice to produce a liquid product containing 1 percent sulfur, and therefore the process of the present invention will not be essential.

As the hydrodesulfurization reaction proceeds, nickel and vanadium removal from the charge tends to occur preferentially over sulfur removal. However, deposition of nickel and vanadium upon the catalyst results in a greater degree of catalyst deactivation than does sulfur removal because the removed metals deposit upon the catalyst whereas sulfur removed from the charge escapes as hydrogen sulfide gas. Low hydrodesulfurization temperatures tend to inhibit metal removal from the charge and thereby reduce catalyst deactivation. Since the hydrodesulfurization reaction is exothermic, it is important to quench the reactor to maintain a reaction temperature as low as the small catalyst size of this invention permits to obtain the desired degree of desulfurization in order to inhibit catalyst deactivation. Unnecessarily high temperatures by encouraging catalyst deactivation will result in loss of the initial temperature advantage of the catalyst of this invention. Quenching is advantageously accomplished by dividing the total catalyst bed into a plurality of relatively small beds in series and injecting relatively cool hydrogen between the beds, as demonstrated below. It is seen that there is a high degree of interdependence between the use of a high metals content asphaltene charge, the small size catalyst particles of this invention, and the use of a quench to insure that the reactor remains at a temperature as low as the catalyst size permits.

The hydrodesulfurization process of this invention employs [conventional reaction conditions such as, for example,] a hydrogen partial pressure of 1000 to 5000 pounds per square inch, generally, 1000 to 3000 pounds per square inch, preferably, and 1500 to 2500 pounds per square inch most preferably. Reactor design limitations usually restrict inlet pressures under the conditions of the present invention to not more than 2000, 2500, or 3000 p.s.i.g. It is the partial pressure of hydrogen rather than total reactor which determines hydrodesulfurization activity. Therefore, the hydrogen stream should be as free of other gases as possible. Furthermore, since reactor design limitations restrict hydrogen inlet pressures, hydrogen pressure drop in the reactor should be held as low as possible.

The gas circulation rate can be between about 2000 and 20,000 standard cubic feet per barrel, generally, or preferably about 3000 to 10,000 standard cubic feet per barrel of gas preferably containing 85 percent or more of hydrogen. The mol ratio of hydrogen to oil can be between about 8:1 and 80:1. Reactor temperatures can range between about 650 and 900° F., generally, and between about 680 and 800° F., preferably. The temperature should be low enough so that not more than about 10, 15 or 20 percent of the charge will be cracked to furnace oil or lighter. At temperatures approaching 800° F. the steel of the reactor walls rapidly loses strength and unless reactor wall thicknesses of 7 to 10 inches or more are utilized a temperature of about 800° F. constitutes a metallurgical limitation. The liquid hourly space velocity in each reactor of this invention can be between about 0.2 and 10, generally, between about 0.3 and 1 or 1.25, preferably, or between about 0.5 and 0.6 most preferably.

The catalyst employed in the process is conventional and comprises sulfided Group VI and Group VIII metals on a support such as nickel-cobalt-molybdenum or cobalt-molybdenum on alumina. Hydrodesulfurization catalyst compositions suitable for use in the present invention are described in U.S. Pat. No. 2,880,171 and also in U.S. Pat. No. 3,383,301. However, an essential feature of the catalyst particles of the present invention is that the smallest diameter of these particles is considerably smaller than the diameter of hydrodesulfurization catalyst particles of the prior art. The smallest diameter of the catalyst particles of the present invention is broadly between about 1/20 and 1/40 inch, preferentially between 1/25 and 1/36 inch, and most preferably between about 1/29 and 1/34 inch. Particle sizes below the range of this invention would induce a pressure drop which is too great to make them practical. The catalyst can be prepared so that nearly all or at least about 92 or 96 percent of the particles are within the range of this invention. The catalyst can be in any suitable configuration in which the smallest particle diameter is within the range of the present invention such as roughly cubical, needle-shaped or round granules, spheres, cylindrically-shaped extrudates, etc. By smallest particle diameter we mean the smallest surface to surface dimension through the center or axis of the catalyst particle, regardless of the shape of the particle. The cylindrical extrudate form having a length between about 1/10 and 1/4 inch is highly suitable.

Since the asphaltene molecules which are hydrodesulfurized in accordance with the present invention are large molecules and must enter and leave the pores of the catalyst without plugging the pores, in order to obtain good aging properties most of the pore volume of the catalyst of this invention should be in pores above 50 A. in size. Advantageously 60 to 75 percent or more of the pore volume should be in pores of 50 A. or more. Most preferably, 80 to 85 percent or more of the pore volume should be in pores above 50 A. in size. Catalysts having smaller sizes pores have good initial activity but poor aging characteristics due to gradual plugging of the pores by the asphaltene molecules. For example, catalyst A below exhibited good activity in the process of this invention for about one month while catalyst B below exhibited good activity for about three months.

| | Catalyst A, percent of pore volume | Catalyst B, percent of pore volume |
|---|---|---|
| Pore size, A.: | | |
| 200–300 | 1.2 | 2.3 |
| 100–200 | 4.2 | 41.7 |
| 50–100 | 16.2 | 43.3 |
| Total | 21.7 | 87.3 |
| 40–50 | 16.4 | 6.4 |
| 30–40 | 22.6 | 5.6 |
| 20–30 | 26.6 | 1.0 |
| 7–20 | 12.5 | 0.0 |

As indicated above, as the diameter of conventional hydrodesulfurization catalyst particles progressively decreases within a range which is above the range of the present invention, hydrosulfurization of a crude oil to a one present sulfur level proceeds at progressively lower temperatures. However, the following tests show that the diminishing of catalyst diameter size to a level within the range of the present invention results in an unexpectedly great reduction in hydrodesulfurization temperature which is much greater than indicated by the particle diameter-temperature relationship exhibited by larger size particles. However, counteracting this temperature advantage is the fact that the small catalyst particle diameters of the present invention result in a large pressure drop through a catalyst bed comprising them, and this pressure drop tends to nullify the temperature advantage achievable with the catalyst of the present invention because hydrodesulfurization temperature requirements increase as hydrogen partial pressures decrease.

Although it is expected that reduction in catalyst particle size will increase pressure drop, we have found that under desulfurization conditions the increase in pressure drop occasioned by using a bed of catalyst particles of the size of this invention as compared to a bed of catalyst particles only slightly larger than those of this invention is great within reactors having moderate diameters. As shown in FIG. 2 the increase in pressure drop occasioned by utilizing the catalyst size of the present invention as compared to slightly higher catalyst sizes can be greatly moderated by utilizing a reactor having a very high diameter such as 10 to 11 feet or more. However, high pressure reactors having large diameters require extremely thick walls, especially under the elevated temperature conditions of the present process.

As indicated above, in the temperature vicinity of 800° F. which is required for hydrodesulfurization of crude oil or reduced crude oil a considerable metallurgical weakening occurs in the steel reactor walls. In order to guard against reactor failures at the 2000 or 2500 + pounds per square inch operating pressures of the process extremely thick steel walls are required, for example, a thickness of 8, 10 and 12 inches. At the reaction temperatures of this invention the required reactor wall thickness increases appreciably with relatively small increases in reactor inlet pressure. Furthermore, at any temperature or pressure of this invention the wall thickness required also increases with reactor diameter. Therefore the excessive increase in reactor wall thickness which is required upon any increase in reactor diameter or reactor temperature exerts a practical design limitation upon maximum allowable pressure in a reactor of the present invention.

The existence of a maximum pressure limitation tends to be prohibitive to the use of a hydrosdesulfurization catalyst having a small diameter because a bed comprising such a small catalyst induces a very high pressure drop, diminishing still further the average pressure within the reactor, and the magnitude of this pressure drop is closely related to reactor diameter. For example, FIG. 2 shows that the pressure drop curves for 1/12 inch, 1/16 inch and 1/32 inch catalyst beds are roughly parallel at reactor diameters of 11 feet or greater. However, the pressure drop curve for the 1/32 inch catalyst of this invention is much steeper at reactor diameters less than 11 feet than the pressure drop curves for the 1/12 inch and 1/16 inch catalyst. Therefore, for a catalyst of the present invention the diameter of the reactor within the range of conventional reactor sizes has an important effect upon pressure drop.

Since there is a practical limit on reactor inlet pressure, as explained above, due to reactor wall thickness requirements, it is important to hold pressure drop in the reactor as low as possible. In effect there is a pressure squeeze in the system in that inlet hydrogen pressure should be held down while reactor outlet pressure should be as high as possible. Therefore, in reactors having an inlet pressure limitation of about 2000, 2500 or 3000 p.s.i.g., the diameter to depth ratio of the catalyst bed should be high enough to reduce pressure drop so that the reactor outlet pressure is not more than about 150, 250 or 350 p.s.i.g. lower than the inlet pressure. Control of reactor pressure differential with a high diameter to depth ratio catalyst bed is especially important in single reactor systems capable of accepting only relatively low inlet pressures. The diameter to depth ratio becomes less important in reactors which can accept relatively high inlet pressures or in parallel reactor systems wherein pressure drop can be reduced by diverting a portion of reactant flow to another reactor.

There is an additional problem relating to pressure drop arising when utilizing the very small catalyst particles of this invention that is alleviated considerably by utilizing a large diameter reactor or parallel reactors. When catalyst particles have the very small size within the range of this invention, reactant flow through them causes them to shift and scrape against each other in a process of compaction. Scraping of particles against one another result in production of fines which further increases pressure drop. Since a catalyst bed may be in continuous operation for long periods of time, production of fines can be considerable. The use of a large diameter reactor or a parallel reactor system, by permitting a greater catalyst cross-section per volume of reactor flow, inhibits fines formation and thereby inhibits an increasing pressure drop across the catalyst field due to this cause.

In accordance with the present invention a hydrodesulfurization catalyst whose diameter is between 1/20 and 1/40 inch which provides an unexpected and substantial temperature advantage due to its size is advantageously divided into separate beds arranged in series to form a reactor train with each succeeding bed in series containing a greater quantity of catalyst than its preceding bed. The total liquid charge stream comprising crude oil or reduced crude oil together with a portion of total hydrogen requirements is charged to the reactor inlet. An effluent stream comprising desulfurized liquid together with gases is withdrawn from the reactor and cooled. Liquid and gases are separated from each other in the cooled effluent stream. Impurities are removed from said effluent gases to provide a recycle hydrogen stream having an increased proportion of hydrogen. The recycle hydrogen is recycled to a plurality of positions in series in the reactor train between the separate catalyst beds therein.

Figure 4:
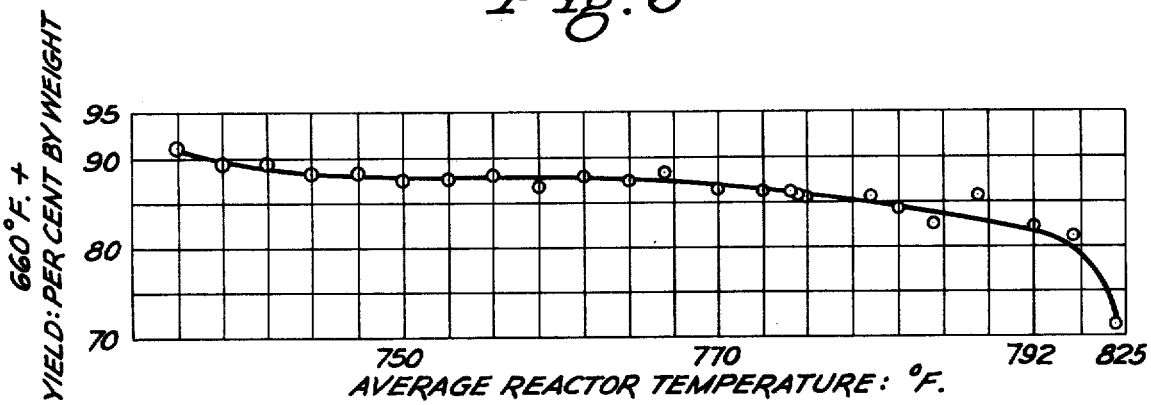

The apportioning of the recycle hydrogen so that it is injected between the separate catalyst beds permits it to serve as a quench to cool the flowing stream as it passes between catalyst beds, thereby permitting reaction temperature to remain near the low temperature level permitted by the small catalyst size. In the absence of a hydrogen quench as described the temperature increase of reactants across each bed would become cumulative so that neither deep beds nor a number of beds in series could be used. Temperatures even slightly higher than necessary are detrimental because, as shown in FIG. 4, moderate temperature elevations considerably enhance thermal cracking of liquid producing among other products light hydrocarbon gases which dilute the hydrogen stream and reduce the partial pressure of hydrogen therein.

The hydrogen quench by reducing the actual temperature also reduces the required temperature and therefore cooperates interdependently with the small catalyst particles of this invention. By lowering the temperature, the hydrogen quench reduces cracking which would consume hydrogen and produce light hydrocarbon gases leading to a lower hydrogen concentration, which in turn would reduce the hydrogen partial pressure and increase the required reaction temperature.

As shown in FIG. 2, at reactor diameters below about 11 feet, the pressure drop through the 1/32 inch catalyst bed of the present invention increases extremely rapidly with reduction in reaction diameter at the indicated space velocity. However, in the diameter range shown the pressure drops through a 1/16 inch catalyst bed and a 1/12 inch catalyst bed, which are both above the range of this invention, are not nearly as sensitive to reduction in reactor diameter below 11 feet. FIG. 2 also shows that at reactor diameters above 11 feet the pressure drop through a 1/32 inch catalyst bed is not significantly more sensitive to changes in reactor diameter than are the pressure drops through the 1/12 inch and 1/16 inch catalyst beds. Therefore, there is a much more sensitive pressure drop relationship between a 1/32 inch catalyst bed of this invention at the reactor diameters shown in FIG. 2 than there is with beds of large size catalyst particles. However, at the high temperature and pressure conditions of the hydrodesulfurization process of this invention metallurgical requirements require reactor walls of great thickness at reactor diameters of 11 feet or more, reactor wall thickness requirements increasing with increasing reactor diameter so that economic considerations prohibit reactor diameters much larger than 11 feet in the process of this invention. FIG. 2 clearly indicates that at the indicated space velocity and with the reactor diameters shown an importance regarding pressure drop sensitivity arises when employing a 1/32 inch catalyst bed which is far greater than in the case of the 1/12 inch and 1/16 inch catalyst bed.

All of the tests indicated in FIG. 2 for the various catalyst sizes were made at the same liquid hourly space velocity. Therefore, in the tests within a reactor of relatively large diameter, the catalyst bed depth was relatively shallow. In the tests within a reactor of relatively small diameter, the catalyst bed was deeper.

EXAMPLE 1

A series of tests were conducted to illustrate the temperature advantage of a small particle size catalyst of the present invention. These tests were conducted by employing NiCoMo on alumina catalyst of various sizes for hydrodesulfurizing a 36 percent Kuwait reduced crude from which furnace oil having an 800° F. TBP had been removed at a 2000 p.s.i.a. partial pressure of hydrogen and a space velocity of 3.0 liquid volumes per hour per volume of catalyst. The charge was 78 percent desulfurized to a 1.0 percent product sulfur content. The arrangement of the reactor was such that there was no significant or readily detectable pressure drop in any of the tests. FIG. 1 shows the effect of catalyst size upon the initial temperature required to produce a product containing 1 percent sulfur. The solid line is based upon initial temperatures determined in tests with 1/8 inch and 1/16 inch diameter extrudate catalyst whose particle size is above the range of this invention. The dashed extrapolation of the solid line indicates that a 1/32 inch diameter extrudate catalyst would be expected to require an initial temperature of about 775° F. However, FIG. 1 surprisingly shows that the 1/32 inch diameter extrudate catalyst requires an initial temperature of only 750° F. It is noted that the surface area defined by the pores of all three catalysts tested is about the same. The position of the data point for the 1/32 inch catalyst is highly surprising because if the dashed line in FIG. 1 were curved downwardly towards the 1/32 inch catalyst data point the resulting curve would tend to indicate that as catalyst particle size becomes very small the activity of the catalyst becomes unlimited, which is obviously unreasonable. Therefore, the straight configuration of the dashed extension of the curve in FIG. 1 is a reasonable extrapolation of the solid line and the position of the 1/32 inch data point is highly unexpected.

EXAMPLE 2

When catalyst similar to the 1/32 inch catalyst of Example 1 except that the particle size is smaller within the range of this invention, such as 1/34 or 1/40 inch, or except that the particle size is larger within the range of this invention, such as 1/29 or 1/20 inch, are utilized under the conditions of Example 1, the initial temperature in each instance to achieve hydrodesulfurization to one percent sulfur is at about the same level as that shown in FIG. 1 for the 1/32 inch catalyst.

EXAMPLE 3

When catalyst compositions other than NiCoMo on alumina, such as NiCoMo on silica alumina, CoMo on alumina, NiW on alumina, NiW on silica alumina, NiW on silica magnesia or NiMo on alumina having a particle size within the range of this invention are utilized under the conditions of Example 1 to achieve hydrodesulfurization to one percent sulfur, a similar unexpected temperature advantage is realized as compared to the extrapolated temperature based on larger size particles of the same composition.

EXAMPLE 4

Figure 5:
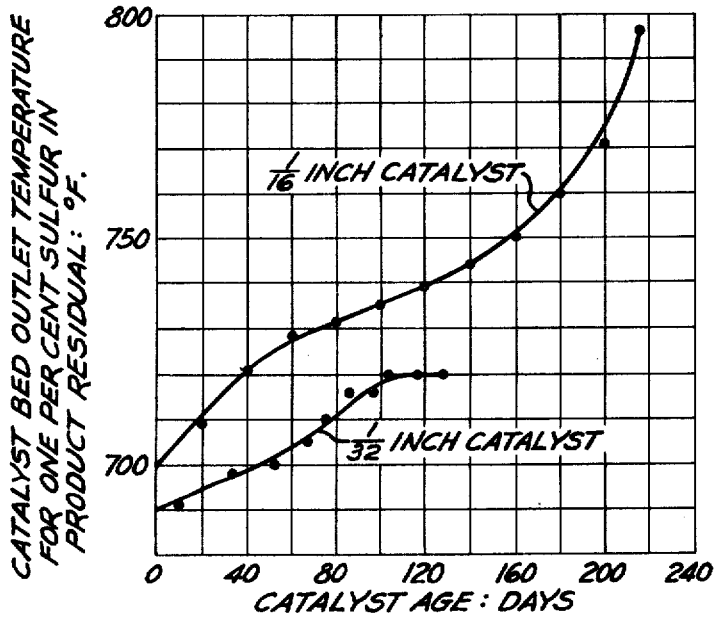
Figure 6:
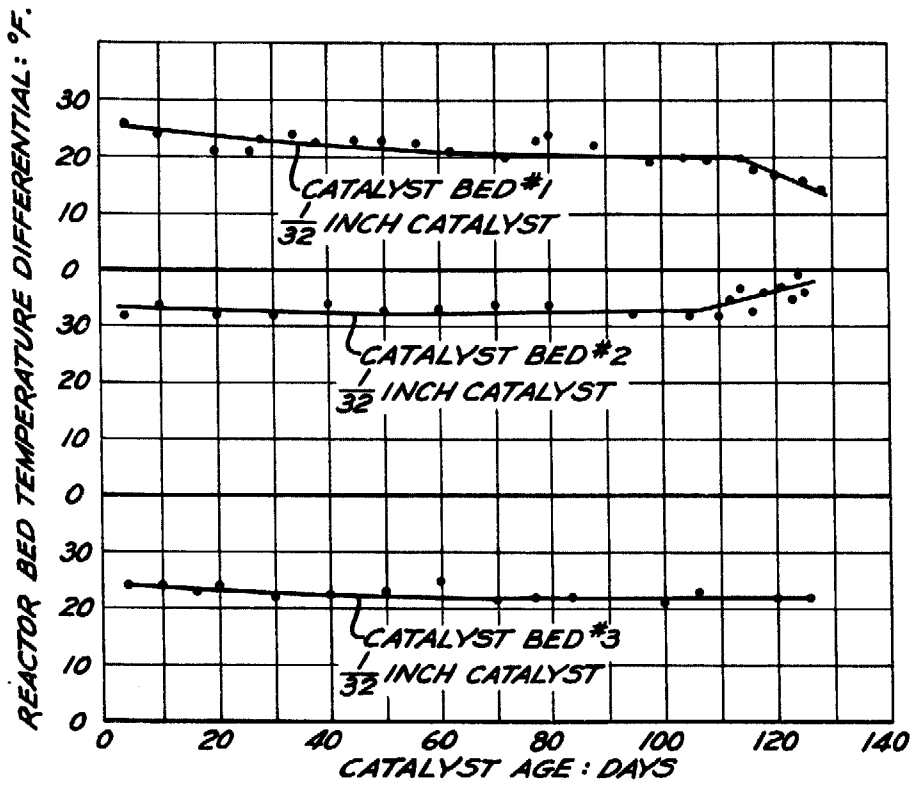

Tests were made which demonstrate that a 1/32 inch nickel-cobalt-molybdenum on alumina extrudate is not only capable of hydrodesulfurizing a reduced crude oil to a one percent sulfur level at a considerably lower initial temperature than a similar catalyst in the form of a 1/16 inch extrudate but also is capable of maintaining a lower hydrodesulfurization temperature with age. The tests with the 1/32 inch catalyst were based on a 0.55 liquid hourly space velocity and a hydrogen partial pressure of 1830 pounds per square inch. The reactor pressure drop was about 50 pounds per square inch. The charge was a 50 percent Kuwait reduced crude. The reaction was performed in a single reactor having three separate beds and recycle hydrogen gas was used as a quench after each bed. There was no separate guard chamber before the reactor. The first, second and third beds contained 13.3 percent, 41.6 percent and 45.1 percent of the total catalyst, respectively. Typical data for the test utilizing the 1/32 inch catalyst are shown below and the general data is illustrated in FIGS. 5 and 6. FIG. 5 shows the aging characteristics for the entire 1/32 inch catalyst reactor as compared with a comparable aging run with a 1/16 inch catalyst reactor. FIG. 6 shows the aging characteristics for the individual beds within the 1/32 inch reactor and shows that when the first bed becomes deactivated the second bed assumes a greater desulfurization load.

The test utilizing the 1/16 inch nickel-cobalt-molybdenum on alumina catalyst was performed as a 1.1 liquid hourly space velocity, but is illustrated in FIG. 5 on a basis comparable to the 0.55 space velocity of the test made with the 1/32 inch catalyst. The total pressure for the 1/16 inch catalyst test was 2500 pounds per square inch gauge. 5000 s.c.f./bbl. of gas was charged to the reactor. The reactor contained four catalyst beds and recycle gas was used as a quench after each bed. The average reactor temperature was increased throughout the test to maintain a 1.0 percent by weight sulfur level in the 660° F. + residual product. Typical data for both the 1/32 inch and the 1/16 inch catalyst tests are shown below.

| | 1/32 inch catalyst | 1/16 inch catalyst |
|---|---|---|
| Oil charge | (1) | (1) |
| Catalyst | (2) | (3) |
| Volume, cc. | 2,294 | 2,254 |
| Weight, grams | 1,543.0 | 1,768.0 |
| Age, days this measurement | 97.6 | 87.6 |
| Total throughput volume oil per volume catalyst | 1,203 | 2,323 |
| Operating conditions | | |
| Reactor hcd temp., ° F.(inlet, outlet) | 694,716 | |
| Reactor pressure | 2,050 | 2,619 |
| Average reactor temp., ° F. | 703 | 781 |
| Space velocity: | | |
| Vol./hr./vol. | 0.51 | 1.11 |
| Wt./hr./wt. | 0.78 | 1.36 |
| Reactor gas charge: | | |
| S.c.f./bbl. | 4,385 | 4,920 |
| Percent H2 | 91 | 81 |
| Makeup gas: | | |
| S.c.f./bbl. | 890 | 735 |
| Percent H2 | 93 | 95 |
| Recycle gas: | | |
| S.c.f./bbl. | 3,495 | 4,233 |
| Percent H2 | 89 | 80 |
| Product yields, wt. percent: | | |
| Bottoms (660° F. +) | 91.1 | 81.7 |
| Furnace oil (380 660° F.) | 4.9 | 9.1 |
| Naphtha (IBP. 380° F.) | 0.8 | 2.2 |
| Gas | 5.1 | 6.1 |
| Chemical hydrogen consumption, s.c.f./bbl. | 476 | 617 |
| Hydrogen sulfide, s.c.f./bbl. | 139 | 127 |

(1) Kuwait 50 percent reduced crude.
(2) 1/32 Inch diameter NiCoMo on alumina extrudates having 0.5 wt. percent nickel, 1.0 wt. percent cobalt and 8.0 wt. percent molybdenum, a surface area of 200 m 2/g and a pore volume of 0.5 cc./g.
(3) 1/16 Inch diameter NiCoMo on alumina extrudates.

The charge and product inspections for the test employing the 1/32 inch catalyst are as follows:

| | Change | Product bottoms |
|---|---|---|
| Gravity, ° API | 11.6 | 20.1 |
| Sulfur, percent by wt. | 4.07 | 1.03 |
| Nitrogen, percent by wt. | 0.22 | 0.17 |
| Carbon residue, percent by wt. | 8.59 | 4.97 |
| Nickel, p.p.m. | 16 | 5.1 |
| Vanadium, p.p.m. | 55 | 9.3 |
| Heat of comb. B.t.u./lb | 18,360 | 19,091 |
| Distillation, vacuum, ° F.: | | |
| At 10% | 715 | 716 |
| At 30% | 809 | 807 |
| At 50% | | 918 |
| At 60% | | 942 |

Note:
Charge, cracking at 995° F.

The 660° F. + residual oil product inspections for the 1/16 inch catalyst test are as follows:

| | |
|---|---|
| Gravity, ° API | 21.4 |
| Sulfur, percent | 1.08 |
| Nitrogen, percent | 0.17 |
| Pour point, D97, ° F. | 65 |
| Viscosity, kin. D445,cs.: | |
| 122° F. | 104.9 |
| 210° F. | 16.36 |
| Carbon residue, Rams. D524, percent by wt. | 4.86 |
| Vanadium, p.p.m. | 14 |
| Nickel, p.p.m. | 6.8 |
| Flash point, D93, ° F. | 390 |
| Distillation vacuum, D1160, ° F.: | |
| At 10% | 719 |
| At 30% | 788 |
| At 50% | 874 |
| At 70% | 1010 |
| At 90% | — |

EXAMPLE 5

Tests were made to show the effect of temperature upon liquid yield in a hydroesulfurization process. The tests were made in a pilot plant equipped with a four-bed 2254 cc. adiabatic reactor. Reactor charge gas was used as quench between the catalyst beds for temperature control. The charge stock passed through a cotton fiber cartridge filter before it was preheated and charged to the reactor. The filter which was at steam tracing temperature takes out most of any solid contaminants in the feed, but does very little in removing any small or organically combined metals present in the charge stock.

The reactor effluent flowed into a high pressure separator where hydrogen-rich gas was separated from the hydrocarbon liquid. The hydrogen-rich gas was scrubbed with 3 percent to 5 percent diethanolamine and water and recycled to the reactor. After high pressure separation of high pressure hydrogen-containing gas, the liquid product flowed to distillation towers where gases, naphtha, furnace oil, and residual were removed from the unit.

The charge to the unit was a 50 percent Kuwait reduced crude. The operation was designed to produce a 660° F. + product having a 1.0 percent sulfur level. The catalyst was 1/16 inch extruded NiCoMo on alumina. The operating conditions were 2500 pounds per square inch gauge total pressure, 1.1 liquid hourly space velocity and 5000 s.c.f/bbl. of 80 percent hydrogen with recycle gas quench as required for temperature control. The results of the tests are illustrated in FIG. 4 and in the following data.

| Catalyst: NiCoMo on alumina having 0.97 wt. percent cobalt, 8.6 wt. percent molybdenum and 0.59 wt. percent nickel. | |
|---|---|
| Age: | |
| Days at this measurement | 45.9 |
| Bbl./lb. | 4.43 |
| Space velocity, LHSV | 1.1 |
| Average reactor temp., ° F. | 760 |
| Reactor gas: | |
| Inlet | |
| S.c.f./bbl. | 5008 |
| Percent $H_2$ | 82 |
| Quench | |
| S.c.f./bbl. | 2920 |
| Percent $H_2$ | 82 |
| Reactor pressure, p.s.i.g. | 2500 |
| Hydrogen consumption, s.c.f./bbl. | 623 |
| Product yields: | Percent by weight |
| $H_2S$ | 3.4 |
| $C_1$ | 0.2 |
| $C_2$ | 0.1 |
| $C_3$ | 0.2 |
| $C_4$ | 0.2 |
| $C_5$-380° F. | 1.5 |
| 380–460° F. | 1.4 |
| 460–600° F. | 2.8 |
| 600–660° F. | 2.5 |
| 660° F. + | 88.6 |

EXAMPLE 6

Tests were conducted to illustrate the effect of a change in hydrogen partial pressure upon the temperature required to hydroesulfurize a reduced crude to 1 percent sulfur in the residual product. The comparative tests were performed by, in one case, not recycling hydrogen containing light hydrocarbons which build up in the hydrogen stream and reduce the partial pressure of the hydrogen in the stream but instead charging to the hydrodesulfurizer only fresh hydrogen charge having a uniform hydrogen purity. In the other case, a recycle hydrogen stream which was not subjected to naphtha scrubbing to remove light hydrocarbons so that the hydrogen partial pressure therein continually decreased throughout the test was recycled to the hydrodesulfurizer. The reactor system catalyst and operating conditions for both tests are generally the same as that described in the tests of Example 4. The results are illustrated in FIG. 3. The solid line in FIG. 3 represents the test utilizing only fresh hydrogen at 1830–1850 pounds per square inch of hydrogen pressure. The broken line in FIG. 3 represents the tests wherein non-naphtha scrubbed recycle gas is recycled causing hydrogen partial pressure to continually decrease so that at the last data point shown the hydrogen partial pressure was 1720–1740 pounds per square inch. The following data are representative of the test represented by the broken line.

| | |
|---|---|
| Oil charge | 50 percent Kuwait reduced crude. |
| Catalyst | 1/32 inch NiCoMo on alumina. |
| Volume, cc. | 2296. |
| Weight, grams | 1771. |
| Age, days at time of this measurement | 7.2. |
| Throughput, vol. oil per vol. cat. | 96. |
| Reactor bed temp., ° F. (inlet, outlet) | 668. 690. |
| Operating conditions: | |
| Reactor pressure, p.s.i.g. | 2058. |
| Avg. reactor temp., ° F. | 676. |
| Space velocity | |
| Vol./hr./vol. | 0.53. |
| Wt./hr./wt. | 0.66. |
| Reactor gas charge | |

-continued

| | |
|---|---|
| S.c.f./bbl. | 4462. |
| Percent $H_2$ | 88. |
| Makeup gas | |
| S.c.f./bbl. | 587. |
| Percent $H_2$ | 94. |
| Recycle gas | |
| S.c.f./bbl. | 3874. |
| Percent $H_2$ | 85. |
| Product yields, wt. percent: | |
| Stripper bottoms | 92.5. |
| Furnace oil | 4.7. |
| Naphtha | 0.6. |
| Gas | 3.7. |
| Net hydrogen sulfide, s.c.f./bbl. | 108. |

| | Charge oil | Product stripper bottoms |
|---|---|---|
| Gravity, ° API. | 15.7 | 20.6 |
| Viscosity, SUS D2161: | | |
| 100° F. | 4.906 | 2.181 |
| 210° F. | 171.8 | 114.8 |
| Carbon, wt. percent | 84.52 | 85.52 |
| Hydrogen, wt. percent | 11.43 | 11.68 |
| Nitrogen, wt. percent | 0.20 | 0.17 |
| Sulfur, wt. percent | 4.06 | 1.11 |
| Carbon residue, wt. percent | 8.16 | 5.12 |
| Nickel, p.p.m. | 16 | 4.7 |
| Vanadium, p.p.m. | .54 | 6.1 |
| Heat of combustion, b.t.u./lb. | 18,423 | 19,908 |
| Distillation, vacuum, ° F.: | | |
| At 5% | 608 | 654 |
| At 10% | 674 | 692 |
| At 20% | 762 | 760 |
| At 30% | 829 | 807 |
| At 40% | | 866 |
| At 50% | | 925 |
| At 60% | | 992 |

Note:
Charge oil, cracking at 888° F. Product stripper bottoms, cracking at 1.011° F.

The above data state that the space velocity is 0.53 vol./hr./vol. so that after 10 days (240 hours) the throughput is 0.53 × 240 or 127 vol./vol. FIG. 3 shows that at the 10 day data point the bed outlet temperature is higher for the decreasing hydrogen pressure test as compared to the constant hydrogen pressure test.

EXAMPLE 7

Simulation experiments were conducted to show the effect of catalyst particle size on pressure drop in hydrodesulfurization process in reactors of various diameters. All tests were made with the same liquid hourly space velocity in a single bed reactor, charging a 75 percent reduced Kuwait crude, using recycle hydrogen and maintaining a hydrogen purity of 77 percent, using reactor inlet and outlet temperatures of 780 and 815° F., respectively, a reactor inlet pressure of 2500 p.s.i.g., and a 1.0 liquid hourly space velocity. Three series of tests were made utilizing reactors of various diameters with 1/12 inch, 1/16 inch and 1/32 inch NiCoMo on alumina catalyst particles. The results are illustrated in FIG. 2.

Figure 7:
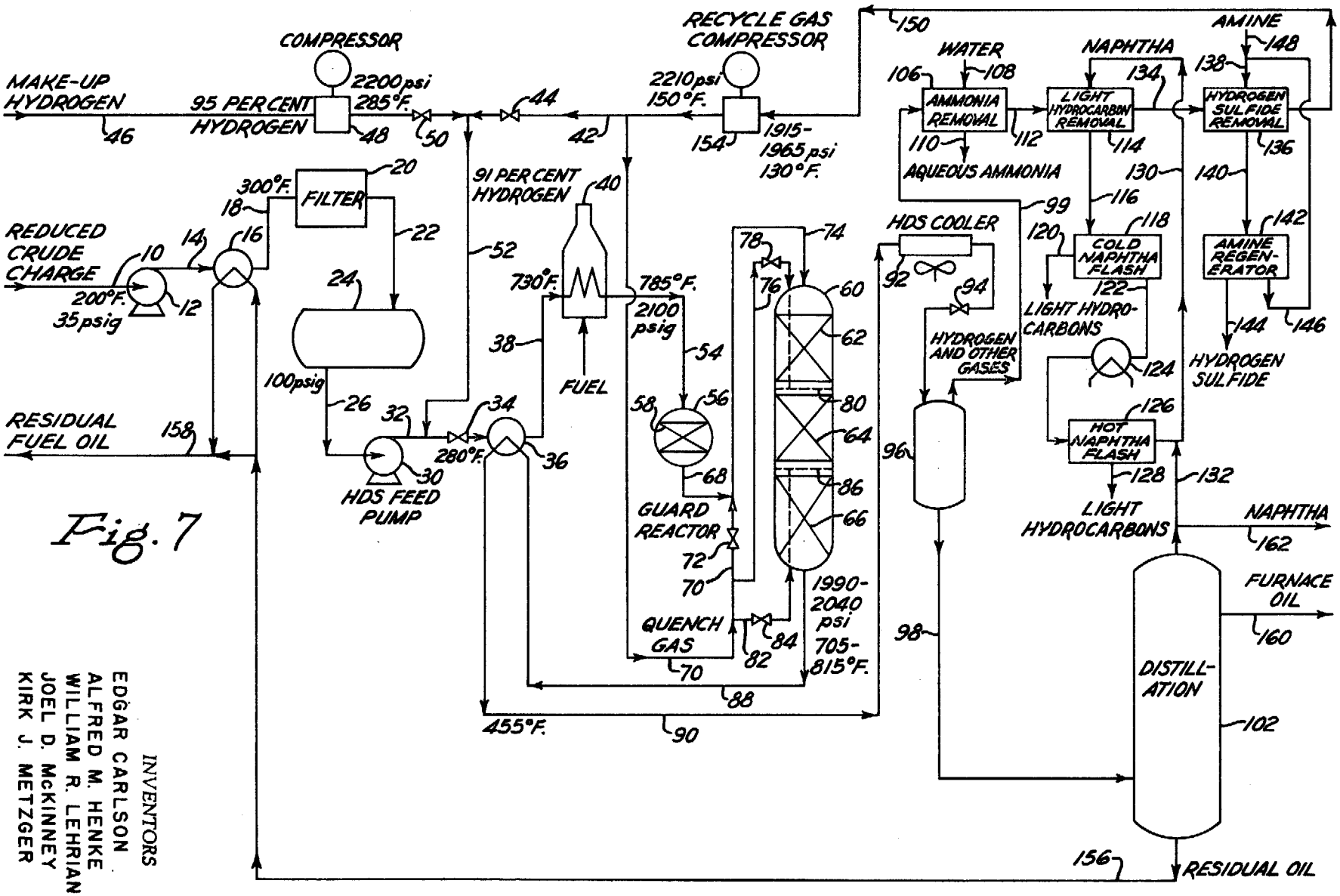

The following description of the process of this invention is made in reference to FIG. 7. FIG. 7 itself indicates suitable temperature and pressure conditions at various points in the process, and these indicated conditions are not reiterated in the following description.

Referring to FIG. 7, a full crude or a reduced crude, such as a 50 percent reduced Kuwait crude which contains the entire asphaltene content of the full crude and therefore also contains substantially all of the nickel, vanadium and sulfur content of the full crude, is charged to the process through line 10 and is pumped by pump 12 through line 14, preheater 16, line 18, solids filter 20 and line 22 to drum 24. From drum 24 the liquid oil charge is passed through line 26 to feed pump 30.

Liquid from pump 30 is admixed with hydrogen from line 52 and passed through line 32, valve 34, preheater 36, line 38 and furnace 40. Liquid flow valve 34 is disposed in a nonfully preheated liquid hydrocarbon line but no valves are utilized in any fully preheated liquid hydrocarbon lines because at the reaction temperatures of this invention if any hydrocarbon should descend into any indentation or crevice of a valve and become stagnant therein for even a brief period of time without full exposure to hydrogen, coking would occur and render the valve inoperative. Therefore, there is no other valve in any liquid line in the vicinity of the reactor until the hot reactor liquid has been cooled downstream from the reactor, as will be shown subsequently.

A mixture of fresh and recycle hydrogen is introduced into the liquid charge to the reactor prior to preheating thereof. Recycle hydrogen is admitted to the liquid charge through line 42 and valve 44. Makeup hydrogen is charged through line 46, compressor 48 and valve 50. A mixture of fresh and recycle hydrogen is introduced to the relatively cool liquid charge through line 52.

The preheated mixture of liquid charge and hydrogen is charged through line 54 to guard reactor 56 containing a bed of catalyst 58. An effluent stream from the guard reactor is charged to main reactor 60 containing catalyst beds 62, 64, and 66. The catalyst beds each contain NiCoMo on alumina catalyst as 1/32 inch extrudates which have the following typical specifications:

Surface area—150 meters$^2$/gram
Pore volume in 50–300 A. radius—60% to 90% of total pore volume
Pore volume—0.5 to 0.8 cc./gram
Compacted density—0.45 to 0.65 gram/cc.
Specific volume of pores—30–40 cc./100 cc.

Each succeeding catalyst bed has a larger volume than the bed just prior to it. If desired there can be four, five, six or more catalyst beds in the reactor. Also, if desired, each reactor bed can have 25 percent, 50 percent, 100 percent, or more, catalyst than the bed just prior to it.

If desired, guard chamber 56 can be omitted in which case line 54 will lead directly into the reactor.

The effluent from the guard reactor is charged through line 68 to which a temperature quenching hydrogen stream is charged through line 70 and valve 72 so that a quenched hydrocarbon and hydrogen stream is charged to the top of the reactor through line 74. The reaction stream is passed through catalyst bed 62 and due to the exothermic nature of the hydrodesulfurization reaction it is heated in passage therethrough and is quenched by recycle hydrogen entering through line 76, valve 78, and sparger 80. The cooled reaction stream is then passed through catalyst bed 64 wherein it increases in temperature so that it is then cooled by a quenching hydrogen stream entering through line 82, valve 84 and sparger 86. Temperatures between the various catalyst beds are controlled by regulating the valves in the various hydrogen quench lines to apportion hydrogen recycle flow. Finally, the reaction mixture passes through catalyst bed 66 and then leaves the reactor in a desulfurized condition through line 88. The reactor effluent stream then gives up some heat at charge preheater 36 and passes through line 90 to air cooler 92 where the effluent is sufficiently cooled so that the valve 94 can be utilized. Because it is disposed after the air cooler, valve 94 is the first valve in a liquid-containing line downstream from the reactor which can be employed without the danger of coking therein rendering the valve inoperative. Reactor effluent enters flash chamber 96 whence desulfurized liquid is discharged through line 98 to a distillation column 102. A gaseous stream comprising primarily hydrogen together with ammonia and hydrogen sulfide formed by nitrogen and sulfur removal from the charge and light hydrocarbons formed by thermal hydrocracking of some of the charge is discharged from flash chamber 96 through line 99.

The gaseous effluent stream passes through unit 106 to which water is added through line 108 and from which aqueous ammonia is removed through line 110. The gaseous effluent from unit 106 is passed through line 112 to light hydrocarbon wash unit 114 to which naphtha from distillation column 102 is pumped in order to wash light hydrocarbons from the hydrogen stream. The wash naphtha is removed through line 116 and passed to flash chamber 118 where some of the dissolved hydrocarbons are flashed off through line 120. Then the naphtha is passed through line 122, heater 124 and hot naphtha flash chamber 126 from which additional light hydrocarbons are flashed through line 128. The regenerated naphtha is recycled through line 130 with makeup naphtha entering through line 132.

The hydrogen stream is then passed through line 134 to hydrogen sulfide removal unit 136 to which an amine such as monoethanolamine is added through line 138. Hydrogen sulfide-rich amine is removed through line 140 and passed to amine regenerator 142 from which hydrogen sulfide is discharged through line 144 and recycle amine exits through line 146. Makeup amine is charged through line 148. A recycle hydrogen stream is then returned to the reactor through line 150.

It is important to remove a substantial amount of the ammonia, hydrogen sulfide and light hydrocarbons from the hydrogen stream prior to recycle because these gases reduce the partial pressure of hydrogen in the reactor. It is the partial pressure of hydrogen rather than the total pressure in the reactor which affects hydrodesulfurization activity. It is not possible to arbitrarily increase total hydrogen pressure in the reactor to compensate for a low hydrogen partial pressure because of severe design pressure limitations in the reactor, as explained above. The recycle hydrogen passes through compressor 154 for increasing the pressure of the hydrogen stream to the reactor.

Hydrodesulfurized residual oil is removed from distillation column 102 through line 156 and is used to supply heat to inlet crude oil heat exchanger 16 prior to its discharge from the system through line 158. Hydrodesulfurized furnace oil is removed from the distillation column through line 160 while naphtha product is removed from the system through line 162.

Figure 8:
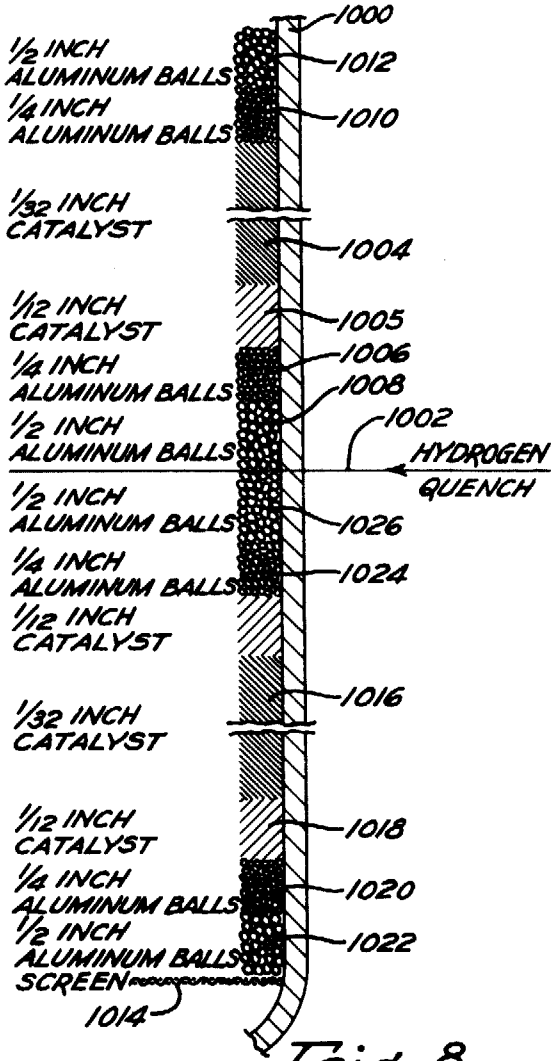

FIG. 8 is a cutaway segment of a multibed reactor in which the lower two catalyst beds are shown. FIG. 8 shows that a bed of the small size catalyst of the present invention is prepared in a manner to secure the particles from excessive relative movement and to prevent the particles from producing fines and plugging screens, both of which conditions would greatly increase the pressure drop in the reactor and tend to further nullify the temperature advantage of the small size catalyst particles.

FIG. 8 shows a steel reactor wall 1000 which may be 7 to 10 inches thick. One bed of catalyst lies above hydrogen quench line 1002 and another catalyst bed lies below this line, each bed filling the entire cross-section of the reactor. The greatest volume of the upper bed comprises 1/32 inch catalyst bed 1004 which rests upon a smaller bed of 1/12 inch catalyst 1005 and 1/4 inch aluminum balls 1006 which in turn rests upon a bed of 1/2 inch aluminum balls 1008. Beds 1005, 1006 and 1008 prevent the 1/32 inch catalyst particles from surrounding and plugging the sparger openings of hydrogen quench line 1002. Above catalyst bed 1004 is a bed 1010 of 1/4 inch aluminum balls and a bed 1012 of 1/2 inch aluminum balls. These latter two beds contribute stabilizing weight to the 1/32 inch catalyst bed to prevent shifting of particles therein during the flow of reactants, which shifting would tend to cause catalyst disintegration and fines formation and thereby greatly enhance pressure drop through the 1/32 inch bed.

The lower bed of catalyst rests upon screen 1014. Screen 1014 is protected from plugging by 1/32 inch catalyst bed 1016 by a gradual increase in particle size between it and the 1/32 inch catalyst bed as indicated by 1/12 inch catalyst bed 1018, 1/4 inch aluminum balls bed 1020 and 1/2 inch aluminum balls bed 1022. Proper distribution of hydrogen and liquid reactant as they approach lower catalyst bed 1016 is insured by bed 1024 of 1/4 inch aluminum balls and bed 1026 of 1/2 inch aluminum balls.

FIG. 8 shows that an elaborate arrangement is required in preparing a catalyst bed of the present invention in order that nearly all the pressure drop through the bed can be confined to the 1/32 inch catalyst beds themselves with very little pressure drop at retaining screens and with a minimum of pressure increase occurring due to fines formation during the reaction.

We claim:

1. A process for the hydrodesulfurization of a crude oil or a reduced crude containing the asphaltene fraction of the crude comprising passing a mixture of hydrogen and said oil through a compact bed of catalyst particles comprising a Group VI metal and Group VIII metal on alumina, the hydrogen partial pressure being [about] 1000 to 5000 pounds per square inch, [and] said particles in said bed being between 1/20 and 1/40 inch in diameter *and a throughput of at least 127 volumes of oil per volume of catalyst is continued for at least 10 days.*

2. The process of claim 1 wherein the particles in said bed are between about 1/25 and 1/36 inch in diameter.

3. The process of claim 1 wherein the particles in said bed are between about 1/29 and 1/34 inch in diameter.

4. The process of claim 1 wherein the catalyst comprises nickel-cobalt-molybdenum on alumina.

5. The process of claim 1 including the step of applying a hydrogen quench to said bed to control the temperature thereof.

6. A process for the hydrodesulfurization of a crude oil or a reduced crude containing the asphaltene fraction of the crude comprising passing a mixture of hydrogen and said oil through a compact bed of catalyst particles comprising a Group VI metal and Group VIII metal on alumina, the hydrogen partial pressure being [about] 1000 to 5000 pounds per square inch, said particles in said bed being between about 1/20 and 1/40 inch in diameter, [and] applying a hydrogen quench to said bed *and a throughput of at least 127 volumes of oil per volume of catalyst is continued for at least 10 days.*

7. The process of claim 6 wherein the particles in said bed are between about 1/25 and 1/36 inch in diameter.

8. The process of claim 6 wherein the particles in said bed are between about 1/29 and 1/34 inch in diameter.

9. The process of claim 6 wherein the catalyst comprises nickel-cobalt-molybdenum on alumina.

10. The process of claim 6 wherein the charge oil contains between about 0.002 and 0.03 weight percent of nickel and vanadium.

11. A process for the hydrodesulfurization of a crude oil or a reduced crude oil containing the asphaltene fraction of the crude comprising passing a mixture of hydrogen and said oil through catalyst particles comprising a Group VI metal and Group VIII metal, said particles being divided into a plurality of compact beds in series, the hydrogen partial pressure being about 1000 to 5000 pounds per square inch, said catalyst particles in said beds being between about 1/20 and 1/40 inch in diameter, applying a hydrogen quench to said catalyst beds, and continuing said process for at least 10 days and a throughout of at least 127 volumes of oil per volume of catalyst.

12. The process of claim 11 wherein the particles in said beds are between about 1/25 and 1/36 inch in diameter.

13. The process of claim 11 wherein the particles in said beds are between about 1/25 and 1/34 inch in diameter.

14. The process of claim 11 wherein the catalyst comprises nickel-cobalt-molybdenum on alumina.

15. The process of claim 11 wherein the charge oil contains between about 0.002 and 0.03 weight percent of nickel and vanadium.

16. The process of claim 1 wherein the hydrogen partial pressure is 1000 to 3000 pounds per square inch.

17. The process of claim 1 wherein the hydrogen partial pressure is 1500 to 2500 pounds per square inch.

[18. The process of claim 1 wherein throughput is continued for at least 10 days and 127 volumes of oil per volume of catalyst.]

19. The process of claim 6 wherein the hydrogen partial pressure is 1000 to 3000 pounds per square inch.

20. The process of claim 6 wherein the hydrogen partial pressure is 1500 to 2500 pounds per square inch.

[21. The process of claim 6 wherein throughput is continued for at least 10 days and 127 volumes of oil per volume of catalyst.]

22. The process of claim 11 wherein the hydrogen partial pressure is 1000 to 3000 pounds per square inch.

23. The process of claim 11 wherein the hydrogen partial pressure is 1500 to 2500 pounds per square inch.

*24. The process of claim 1 wherein a throughput of at least 1,293 volumes of oil per volume of catalyst is continued for at least 97.6 days.*

*25. The process of claim 6 wherein a throughput of at least 1,293 volumes of oil per volume of catalyst is continued for at least 97.6 days.*

*26. The process of claim 11 wherein a throughput of at least 1,293 volumes of oil per volume of catalyst is continued for at least 97.6 days.*

* * * * *